J. BRAINERD.
Rotary-Harrow.
No. 30,198.
Patented Oct. 2, 1860.
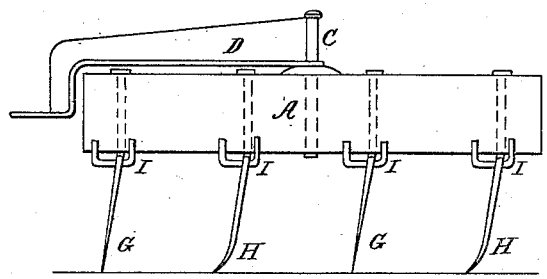
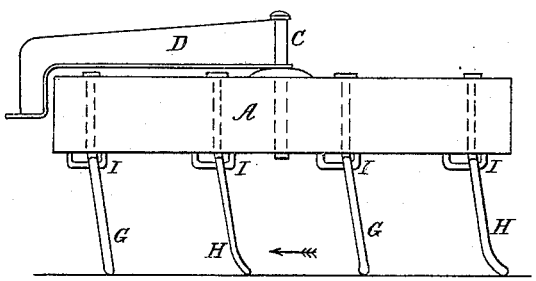
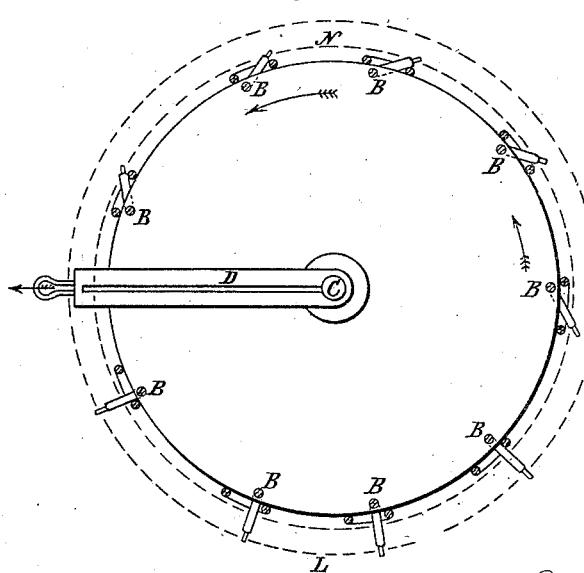
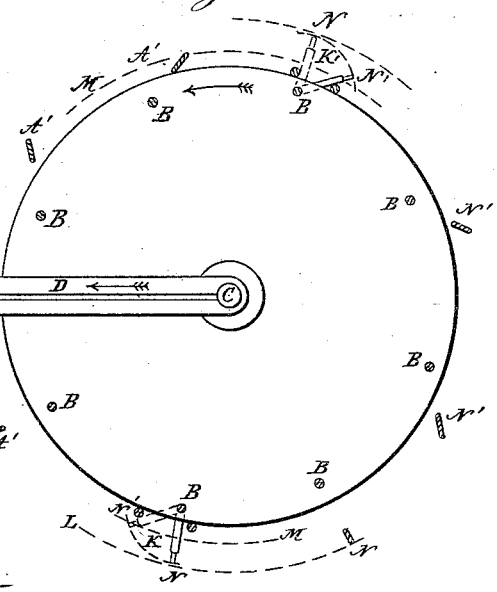
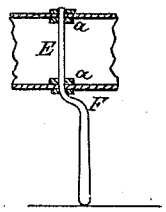
Witnesses:
J. J. Everett
G. C. Lambright
Inventor:
J. Brainerd.

UNITED STATES PATENT OFFICE.

JEHU BRAINERD, OF CLEVELAND, OHIO.

IMPROVEMENT IN ROTARY HARROWS.

Specification forming part of Letters Patent No. 30,198, dated October 2, 1860.

*To all whom it may concern:*

Be it known that I, JEHU BRAINERD, of Cleveland, in the county of Cuyahoga and State of Ohio, have invented new and useful Improvements in Rotary Harrows; and I do hereby declare that the following is a full and complete description of the construction and operation of the same, reference being had to the accompanying drawings, making part of this specification, in which—

Figure 1 is a side view. Fig. 2 is a side view opposite that seen in Fig. 1. Figs. 3 and 4 are top views, and Fig. 5 is a section.

Like letters refer to like parts in the several views.

My invention relates to feathering the harrow-teeth by means of the peculiar form thereof and the manner in which they are secured to the frame of the harrow—that is to say, the teeth have a partial rotation upon their own axis while revolving around the common center of the harrow-frame, the teeth having such a form that the portion which enter the soil as the harrow is drawn forward upon one side of the frame adjust themselves at a greater distance from the common center of the frame than do those teeth upon the opposite side. This feathering or self-adjustment of the teeth upon greater and lesser circles causes the whole harrow to rotate, as hereinafter specified.

A in the several views represents the frame of the harrow. This may be made of cast-iron, wrought-iron, or wood. In the latter case the frame may consist of radial arms secured together in any convenient manner. The form of the frame is immaterial; but the shanks of the teeth must be placed in circles (of which there may be one or more)—that is, the shanks of all the teeth belonging to one circle must have an exact radial distance from the center of the frame, as seen at B, Figs. 3 and 4.

C represents a pin or standard secured to the center of the frame and projecting upward some six or eight inches, and to this pin C the draw-bar D is attached and upon which it turns freely. The frame of the harrow can therefore revolve beneath the draw-bar.

The harrow-teeth may be made of cast-iron, wrought-iron, or steel.

The shank E, Fig. 5, should be round and fitted to boxes in the frame, placed vertical to each other, as seen at *a* in Fig. 5. They are secured at the upper end by a pin or nut and washer, and by a collar beneath the lower box. Just below the frame the teeth make a horizontal angle or turn at right angles nearly to the shank E. This horizontal part F, Fig. 5, is about six inches in length from whence they turn downward, as seen in Figs. 1, 2, and 5. The lower part of the teeth may be square, round, or flattened in the direction of the angle F. They may be vertical, as in Fig. 5, or inclined, as shown in Figs. 1 and 2 at G; or they may be curved, as at H. I make no claim as to the form of the teeth below the angle F.

Just at the angle F of each tooth is placed a guide and stop, I, Figs. 1 and 2. This guide and stop allows the teeth to sweep around upon their own axis from seventy to eighty degrees arc of a circle outward from the center of the harrow, as seen at K K′ in Fig. 4, so that in sweeping around from N′ to N in Fig. 4, the angle F will be brought upon a radial line with the center of the harrow, and the point of the tooth will occupy the line forming the circumference of the larger circle L in Figs. 3 and 4; but when the point of the tooth falls back from N to N′, as seen at K′ in Fig. 4, then the angle F, if continued by a line across the circle of the harrow, would form a sine of said circle, and the point of the tooth would occupy the inner circle, M.

The friction of the earth as the harrow is drawn over the ground will feather the teeth—that is, it will cause them to move from N′ to N, as at K, and from N to N′, as at K′. They will consequently be all brought into the position seen in Fig. 3. Those on the left hand of the harrow, looking toward the team or in the direction in which the harrow is drawn, will rest upon the ground upon the circumference of the larger circle L, while those teeth on the right side will fall back to the circumference of the smaller circle M. All the teeth therefore upon the left hand of the harrow being brought continually and successively to a greater distance from the draft-pin C will cause the harrow to slowly rotate as it is drawn over the ground, the teeth in their position at L, Fig. 3, forming for the instant the center of rotation. The teeth upon the right-hand side falling successively into the lesser circle M, Fig. 3, offer less resistance by being nearer the center pin, C, move over the ground with greater speed than those on the opposite side. If the points of the teeth are flattened, as above described, they will present their broad and narrow surfaces to the soil relatively, as seen at N N', Fig. 4.

For the purpose of causing the harrow to strike more or less deeply into the soil, I provide an open box which may be firmly secured to the draw-bar exactly over the center of the harrow-frame, into which stone or other convenient weights can be placed to the extent desired.

Some of the advantages this construction of rotary harrow possesses over others are its simplicity and cheapness. It is not liable to clog with weeds and stubble. It penetrates as deeply into the soil upon the side that moves most rapidly over the ground as it does upon the opposite side, which in itself is a very important consideration.

What I claim as my improvement as new in rotary harrows, and for which I desire Letters Patent, is—

Feathering the teeth thereof, substantially as herein described.

JEHU BRAINERD.

Witnesses:
J. C. RICHARDS,
T. T. EVERETT.